United States Patent
Suzuki et al.

(10) Patent No.: US 6,699,550 B2
(45) Date of Patent: Mar. 2, 2004

(54) BASE-BODY FOR PHOTOSENSITIVE DRUM AND PHOTOSENSITIVE DRUM WITH THE USE OF THE SAME

(75) Inventors: Takahiro Suzuki, Tokyo (JP); Munenori Iizuka, Tokyo (JP); Kunio Machida, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/120,370

(22) Filed: Apr. 12, 2002

(65) Prior Publication Data
US 2003/0027914 A1 Feb. 6, 2003

(30) Foreign Application Priority Data

| Apr. 12, 2001 | (JP) | 2001-113768 |
| Apr. 12, 2001 | (JP) | 2001-113769 |
| Apr. 12, 2001 | (JP) | 2001-113770 |
| Apr. 12, 2001 | (JP) | 2001-113771 |
| Apr. 12, 2001 | (JP) | 2001-113772 |
| Apr. 12, 2001 | (JP) | 2001-113773 |
| Apr. 12, 2001 | (JP) | 2001-113776 |
| May 29, 2001 | (JP) | 2001-160479 |

(51) Int. Cl.[7] .................... B29D 22/00; B29D 23/00; B32B 1/08

(52) U.S. Cl. ........... 428/36.91; 428/36.9; 428/474.4; 428/500; 428/36.4; 428/35.7; 430/62; 430/63; 430/69; 430/59

(58) Field of Search .............. 428/34.1, 34.4, 428/34.5, 34.6, 34.7, 35.7, 36.4, 36.9, 36.91, 474.4, 500; 430/62, 63, 69, 59

(56) References Cited

U.S. PATENT DOCUMENTS

| 4,664,995 A | * | 5/1987 | Horgan et al. ............ 430/59 |
| 4,702,859 A | * | 10/1987 | Shimizu et al. .......... 252/511 |
| 5,712,067 A | * | 1/1998 | Kawata .................... 430/59 |
| 5,872,187 A | * | 2/1999 | Takatani et al. .......... 525/133 |

FOREIGN PATENT DOCUMENTS

| EP | 0 984 330 A1 | * | 8/1999 | ........ C03G/5/10 |
| EP | 1 113 047 A1 | * | 7/2001 | ........ C08L/77/00 |

* cited by examiner

Primary Examiner—Harold Pyon
Assistant Examiner—Michael C. Miggins
(74) Attorney, Agent, or Firm—Oblon, Spivak, McClelland, Maier & Neustad, P.C.

(57) ABSTRACT

The invention relates to a cylindrical resinous base-body for a photosensitive drum, and a photosensitive drum that includes the resinous base-body.

22 Claims, 1 Drawing Sheet

Fig. 1

BASE-BODY FOR PHOTOSENSITIVE DRUM AND PHOTOSENSITIVE DRUM WITH THE USE OF THE SAME

BACKGROUND OF THE INVENTION

1. Field of the Invention

This invention relates to a cylindrical resinous base-body for a photosensitive drum, and a photosensitive drum that includes the resinous base-body. Further, in detail, this invention relates to a cylindrical resinous base-body for a photosensitive drum to be used for an image formation apparatus such as an electrophotographic apparatus, an electrostatic recording apparatus and the like. The resinous base-body is light in weight, easily molded, excellent in dimensional stability, and also superior in image characteristics when used as the photosensitive drum including the base-body.

2. Description of the Related Prior Art

In the conventional electrostatic recording process in an electro photographic apparatus or an electrostatic recording apparatus such as a copying machine, a facsimile equipment, and a printer, an electrostatic latent image is formed by uniformly charging the surface of a photosensitive drum with photoconductive material [for example, ZnO, CdS, Se, OPC (organic semiconductor), amorphous silicon (a-Si), etc.] layer. Then, a toner image is formed by erasing electrostatic charge of the light-irradiated area irradiated image-wisely on the layer from optical system and subsequently supplying a toner on the resultant electrostatic latent image by electrostatic adhesion, and by transferring the resultant toner image to recording media such as paper, photographic paper, etc. or a sheet for an overhead projector, a recorded image is obtained.

Figure 1:
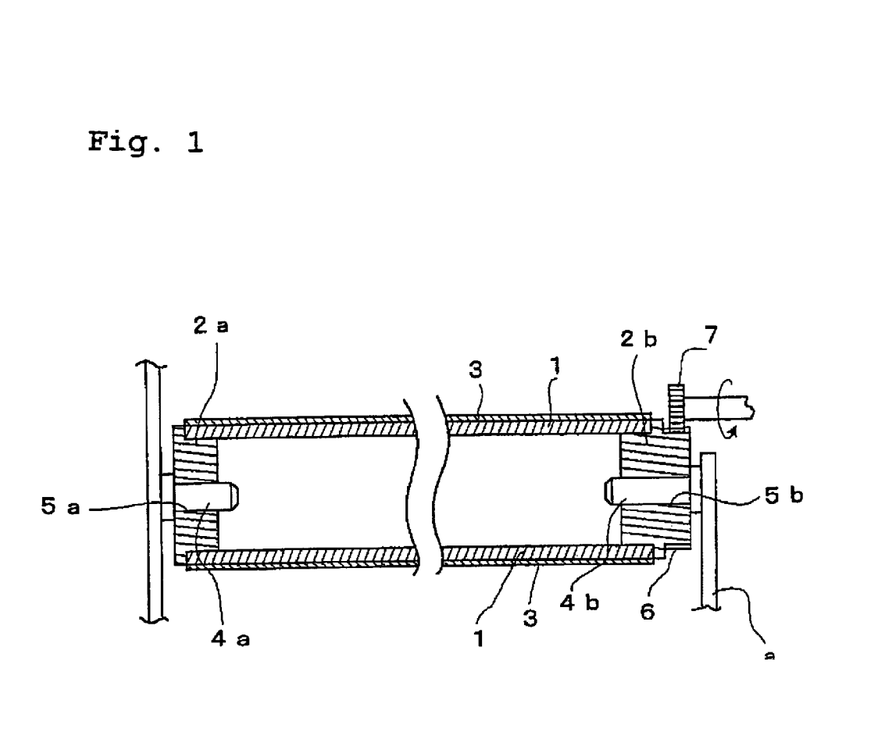
FIG. 1 is a cross sectional view showing a general structure of a photosensitive drum; numerical symbol 1 shows cylindrical base-body (a base-body for photosensitive drums), numerical symbols 2, 2a and 2b show flanges, numerical symbol 3 shows photosensitive layer, numerical symbols 4a and 4b show shaft, numerical symbols 5a and 5b show holes provided on the flanges and numerical symbol 6 shows driving gear.

As a photosensitive drum to be employed for aforementioned electrostatic recording process, up to now, a drum having a structure shown in FIG. 1 has conventionally been utilized. Namely a drum consists of a cylindrical base-body 1 having good electroconductivity, both ends of the base-body are assembled and fixed with the flanges 2a and 2b respectively and also the surface of the base-body is applied with a photosensitive layer. Further, the drum is supported by the shafts 4a, 4b provided in the main-body of an electrophotographic apparatus and the shafts are inserted into the holes 5a, 5b provided in the both flanges 2a, 2b respectively so as to rotate the drum freely. The drum is rotated by engaging the driving gear 6 provided to the flange 2b with the gear 7 engaged with a driving source such as motor and the like, therefore the drum is driven rotationally.

In a photosensitive drum employed for the aforementioned electrostatic recording processes, a cylindrical or columnar drum base-body made of aluminum alloy obtained by molding has been conventionally utilized because of lightweight, fine machining capability thereof as well as good electroconductivity. Recently however, a cylindrical resinous base-body made of an electroconductive resin composite by injection molding has been utilized too. Such composite is a mixture of a thermoplastic resin and an electroconductive agent such as carbon black. This cylindrical resinous base-body has many advantages as the followings:

Integral molding is applicable for accessories such as the flange or the gear along with base-body part.

It operates with less vibration and with low noise.

Few charge leaks from the cylindrical resinous base-body.

Damping characteristic of the potential regarding the cylindrical resinous base-body is gentle.

Recycling performance of the cylindrical resinous base-body improve.

At this point, there has been desired a more lightweight drum in view of lowering cost, saving electric-power consumption and so on. The aforementioned resinous base-body for photosensitive drums is possible to accomplish a lightweight drum in comparison with a base-body made of aluminum alloy. Unfortunately, it has been further requested to provide a base-body for photosensitive drums with a more lightweight drum so as to save the driving power further; namely lowering cost and saving electric-power consumption has been severely requested to not only photosensitive drums but also materials for electrophotographic apparatuses.

In this case, it is easily possible to achieve weight saving of the aforementioned resinous base-body by providing the base-body with the wall having thinner thickness. It has not been easy, however, to thin the wall since the thinning causes lowering mechanical strength, moldability, dimensional stability and so on. Further, there has been requested, for the aforementioned photosensitive drum, high dimensional precision such as external/internal diameters precision, straightness, perfect-circularity and the like, and also since it is necessary to keep the performance under various application conditions such as high-temperature high-humidity, low-temperature low-humidity and so on, however there has not been realized in any photosensitive drum, up to now, to fulfil the requirements because of the lowered dimensional precision under the environment of high-temperature and high-humidity particularly. In this case, particularly a photosensitive drum is likely exposed for one hour under the high temperature of 120–140° C. during a drying step of an OPC(organic semiconductor) photosensitive layer. Therefore, under the condition of the high temperature, the resin is deformed and followed by causing deterioration of external/internal diameters precision and rotational wobble, consequently there leads to a problem of adverse affect to image characteristics.

On the other hand, a metal base-body for photosensitive drums is low in water absorption, therefore there is no change in dimension after long-term usage or usage under high- temperature and high-humidity. Since the change in dimension of the base-body for drums employed aforementioned resin occurs due to water absorption by the resin, there are problems such as formation of image unevenness and the like.

Further, in the case of proceeding the functional cycle of charge, exposure, transfer, discharge, charge, etc., the attenuation characteristic (surface resistance value) of the electric potential on the aforementioned exposure is important. In the case of equipping a photosensitive drum for an image formation apparatus printing at normal speed like 10–15 sheets/min, the surface resistance value is reasonably about $10^4$–$10^5$ Ω/□. But, since the drum rotates more speedy in the case of equipping a photosensitive drum for an image formation apparatus printing at higher speed, for example 20–40 sheets/min, image inferior like fog is likely occurred due to the high residual electric potential if the attenuation of the electrical potential on the exposure is not proceeded promptly.

Furthermore, in the case that the aforementioned resin is employed as a base-body for photosensitive drums and the resin is soluble to coating solution forming the photosensitive layer, there is problem of not providing a photosensitive drum being able to form an image of excellent quality. In addition, if adhesion of a photosensitive layer formed is weak, there is another problem of a poor image being caused thereby.

SUMMARY OF THE INVENTION

Under the circumstances aforementioned, the object of this invention is to provide a resinous base-body for photosensitive drums being employed to an electrophotographic apparatus; namely the base-body that is superior in moldability, impact strength and dimensional stability, and also easy of weight saving, thinning wall-thickness without lowering mechanical strength as well as moldability. It is another object of this invention is to provide the resinous base-body for photosensitive drums, which enables to form excellent image while controlling occurrence of inferior images. Furthermore, it is still another object of this invention to provide a photosensitive drum including the base-body.

As a result of zealously repeated study by the inventors in order to achieve said objects, this invention was completed to develop a resinous base-body for photosensitive drums having aforementioned excellent performance. This invention provides a cylindrical resinous base-body for photosensitive drums to be used for an electrophotographic process, being made of an electroconductive resin composition and satisfying at least one characteristic selected from the following requirement of from (1) to (7);

(1) a specific gravity of said resin composition is from 1.1 to 1.7,
(2) an apparent viscosity of said resin composition at the apparent shear rate of $10^4$ $S^{-1}$ is from $1 \times 10^2$ poise to $3 \times 10^3$ poise,
(3) an Izot impact value of the said resin composition is 30 J/m or greater,
(4) a water absorption percentage of the said resin composition is 1.5% or less,
(5) a load flexure temperature of the said resin composition is 150° C. or higher,
(6) a change in dimension of the external diameter of said base-body is 1.5% or less, and
(7) a surface resistance of said base-body is $1 \times 10^3$ $\Omega/\square$ (ohm/square) or less.

Further, this invention provides a photosensitive drum characterized in that said resinous base-body has a photosensitive layer on the surface thereof, in particular the photosensitive drum being excellent in adhesion with the photosensitive layer.

BRIEF DESCIPTION OF THE DRAWING

In FIG. 1, although the shaft is divided into 4a and 4b, they may be connected each other thereby forming a single shaft.

DESCRIPTION OF THE PREFERED EMBODIMENTS

The base-body for a photosensitive drum of the present invention is a resinous base-body and is provided with at least one characteristic of aforementioned (1) to (7); namely the base-body being able to form images of excellent quality without losing mechanical strength and the like. Further, it is preferable that said base-body satisfies at least the aforementioned characteristics of (1), (3) and (5), at least the aforementioned characteristics of (4) and (6), or at least the aforementioned characteristics of (2) and (7).

The base-body for photosensitive drums of this invention is molded from an electroconductive resin composition so as to form a desired cylindrical or columnar shape base-body by applying conventional methods such as injection molding or extrusion molding, wherein the resin composition is obtained by blending an electroconductive agent and filler with a base-resin. Further, injection molding is preferred as the molding method.

In the base-body for photosensitive drums of this invention, it is preferable to employ an electroconductive resin composition having the specific gravity of from 1.1 to 1.7 so as to produce the resinous base-body for photosensitive drums and a photosensitive drum including the base-body, which contributes the needs for cost saving and electric power consumption saving since it is easy to achieve weight saving without losing mechanical strength, good molding performance and dimensional precision thereof particularly.

By controlling the specific gravity to the aforementioned range, it was realized to save cost and electric-power consumption by weight saving while holding enough mechanical strength, molding performance and dimensional precision. In addition, the specific gravity is measured in accordance with the water displacement method of JIS K7112. In this case, if the specific gravity of said electroconductive resin composition is too small, although it is possible to develop a very lightweight base-body, it become difficult to put the photosensitive drum including the base-body into a practical use because of sharp decline of mechanical strength, moldability, dimensional precision and so on thereof. On the other hand, if the specific gravity is too large, although it is possible to achieve excellent mechanical strength, moldability and dimensional precision, the object of the present invention is not achieved because the load derived from driving the drum having increased weight to a drive-part or shafts hinders smooth rotation of the drum owing to increased torque, and also the increase in cost and electric-power consumption is incurred. The preferable range of the specific gravity thereof is from 1.3 to 1.7.

Further, the flexural rigidity of said electroconductive composition is $4.0 \times 10^6$ kg·mm$^2$ or more, preferably $5.0 \times 10^6$ kg·mm$^2$ or more in view of holding enough mechanical strength, wherein the flexural rigidity is derived from measuring the flexural modulus of a test piece molded from an electroconductive resin composition in accordance with ASTM D-790 and followed by calculation of the following equation:

$$E1 = E \times \pi/64 \times (d_2^4 - d_1^4)$$

(Wherein E 1 is the flexural rigidity, E is the flexural modulus, $d_1$ is the external diameter of the base-body, $d_2$ is the internal diameter of the base-body).

In this invention, the apparent viscosity of said electroconductive resin composition at the apparent shear rate of $10^4 S^{-1}$ is preferably in the range from $1 \times 10^2$ poise to $3 \times 10^3$ poise in order to produce a high quality resinous base-body for photosensitive drums and a drum including the base-body without losing, in particular, mechanical strength, molding performance and dimensional precision, and also without causing poor molding performances such as short-shot, mold flash and so on.

By adjusting the apparent viscosity as aforementioned, it becomes able to mold the base-body for photosensitive drums since it is able to control occurrence of short-shot or mold flash during the molding of the base-body from an electroconductive composition. In addition, the apparent viscosity of the electroconductive composition is measured in accordance with JIS K7210 (reference test).

In this case, if the apparent viscosity of said electroconductive resin composition at the apparent shear rate of $10^4 S^{-1}$ is too high, there happens to be short-shot (less filling) or inferior transfer of the mold surface; on the other hand, if it is too low, mold flash is formed, therefore the product yield is reduced and the object of the present invention is not achieved. Therefore, the preferable range of apparent viscosity of said electroconductive resin composition at the apparent shear rate of $10^4 S^{-1}$ is from $1 \times 10^2$ poise to $1 \times 10^3$ poise.

The measuring temperature of the apparent viscosity of said electroconductive resin composition at the apparent shear rate of $10^4 S^{-1}$ is preferable to be higher than the melting point of a base-resin in an electroconductive resin composition, and more preferable to be from 20° C. to 30° C. higher than the melting point. Concretely, although it is not unconditionally established because of a melting point of the base-resin to be employed and the like, the measuring temperature is ordinary to be from 200 to 350° C.

In this invention, in order to produce a high quality resinous base-body for photosensitive drums having enough strength similar to a metal drum and also not being damaged by impact in the case of transportation or falling down thereof as well as a photosensitive drum including the base-body, an Izot impact value of the electroconductive resin composition is preferably 30 J/m or larger. By controlling the Izot impact value as mentioned, it becomes easier to prevent the drums from damaging due to impact in the case of transportation or falling down thereof. In addition, the Izot impact value is measured in accordance with ASTM D-256.

In this case, if the Izot impact value of said electroconductive composition is 30 J/m or less, the object of this invention is not achieved because of insufficient strength thereof; thereby resulting to damage thereof by impact in case of transportation or falling down. In addition, the preferable range of an Izot impact value is 35 J/m or larger, more preferably 35 to 55 J/m.

In this invention, so as to produce a resinous base-body for photosensitive drums having high dimensional precision even under the use condition of high temperature-high humidity particularly, the water absorption percentage of the electroconductive composition is preferably 1.5% or less. By controlling the water absorption percentage as mentioned, the weight saving is achieved while maintaining the sufficient dimensional precision (external-internal diameters precision, rotational wobble, perfect circularity, straightness and the like). Herein, the water absorption percentage is measured in accordance with ASTM D-570.

In this case, if the water absorption percentage is more than 1.5%, it is very difficult to achieve the object of this invention because it is not possible to keep the dimensional precision (external-internal diameters precision, rotational wobble, perfect circularity, straightness and the like) under the use condition of, for example, high-temperature high-humidity. Herein, the preferable water absorption percentage thereof is 0.7% or less.

Further, in this invention, it is preferable that the variation of the external diameters of each end of the base-body is 0.1 mm or less, particularly 0.05 mm or less; wherein the variation is defined as the difference between the diameter after the base-body is left for 24 hours under the condition of 50° C. for 90% RH (relative humidity) and the diameter before it is left under said condition.

In this invention, so as to produce a resinous base-body for photosensitive drums having excellent dimensional stability even during a drying step of an OPC(organic photoconductor) layer under the use condition of high-temperature high-humidity while the dimensional precision is maintained particularly under high-temperature high-humidity, the load flexure temperature of an electroconductive composition for the base-body is preferably 150° C. or higher.

It enables to achieve the weight saving thereof while maintaining enough heat resistance by controlling the load flexure temperature as mentioned above. Herein, the load flexure temperature of a base-body for photosensitive drums is measured in accordance with JIS K7207. In this case, if the load flexure temperature of a base-body for photosensitive drums is less than 150° C., the high dimensional precision can not be maintained due to the resin distortion, therefore, the object of the present invention is not achieved. Herein, the load flexure temperature is preferably 170° C. or higher, more preferably 200° C. or higher.

Further, the variation of straightness of the base-body is 40 μm or less, preferably 20 μm or less, more preferably 15 μm or less; herein, the variation of straightness is defined as the difference between the straightness after the base-body is left at 120° C. for 2 hours and the straightness before it is left under said condition. In this case, the straightness thereof is preferably 100 μm or less, more preferably 80 μm or less. Herein, the straightness means a measure of geometrical tolerance as defined in JIS B0021, and it is measured by the method as written in following description: A cylindrical resinous base-body is placed approximately in a direction parallel to the benchmark-edge having high linear precision, then the clearance between the benchmark-edge and the surface of the cylindrical base-body is measured in the length direction by using a laser detector and a laser transmitter, thereafter a graph is made of plotting the data and followed by drawing a base line tangent to the both ends of the graph. The maximum deviation from the base line is the straightness.

In this invention, so as to produce a photosensitive drum with excellent stability due to particularly very low dimensional variation and being able to form an excellent image without unevenness, and also so as to prepare a base-body suitable for the photosensitive drum, the photosensitive drum can be rotated and the variation of its diameter is preferable to be 1.5% or less, and more preferable to be 1.0% or less. If said variation is more than 1.5%, the base-body is poor in dimensional stability so that its integration to the drum is obstructed. As said base-body for the photosensitive drum, the dimensional variation in the entire length is preferably 0.15% or less, more preferably 0.10% or less. If said dimensional variation in the entire length is more than 0.15%, it is not possible to form an image with excellent quality because of image unevenness being caused by poor dimensional stability.

Herein, a perfect circle is preferable as the cross-sectional shape of the base-body for the photosensitive drums at the plane of the base-body that is perpendicular to its rotational axis. The diameter of the perfect circle is the diameter for this invention. Further, said entire length means the length in direction of the rotational axis of the base-body for the photosensitive drums In this invention, said dimensional variation is evaluated as the followings: firstly measuring the diameter and the entire length under the normal temperature and normal humidity (the temperature 25° C., the humidity 50% RH); followed by leaving the base-body for 240 hours in a heat-humidity oven being kept at high-temperature and high-humidity (the temperature 50° C., the humidity 90% RH) and then measuring the same, thereby evaluating the dimensional variation. In the aforementioned measurements, by employing a dimensional measuring apparatus (Laser Scanning Micrometer), the base-body for photosensitive drums is rotated at the speed of 3 rotations per second and the measurements of 256 times during said three rotations are carried out, consequently averaging the results therefrom so as to obtain the measurement value.

In this invention, so as to produce a resinous base-body for photosensitive drums which is particularly easy in molding and also able to control generation of a poor image because of its excellent attenuation characteristics at the exposure step, and also the photosensitive drum including the base-body, the surface resistance value is preferably $1 \times 10^3$ $\Omega/\square$ (ohm/square) or less. Normally, since the base-body for photosensitive drums of this invention is used for a photosensitive drum being installed into a high-speed image formation apparatus, which proceeds printing at the speed of 20 to 40 sheets/minute, the surface resistance thereof is preferably $1 \times 10^3$ $\Omega/\square$ or less. If the surface resistance is more than $1 \times 10^3$ $\Omega/\square$, inferior image caused by black spots, fog or the like is likely formed because of lowered its surface electric potential characteristics (attenuation characteristic at an exposure step). Further, although there is no lower limit for the resistance, it is preferably $1 \times 10^0$ $\Omega/\square$ or more from the view point of other physical properties thereof Therefore, the preferred range of the surface resistance is from $1 \times 10^0$ $\Omega/\square$ to $5 \times 10^2$ $\Omega/\square$. In addition, the surface resistance is measured by using a four-point-probe type resistivity measurement device manufactured in accordance with JIS K7154.

There is no limitation for a resin component of the electroconductive resin composite, but a thermoplastic resin is preferable. Although it is possible to select optionally a suitable resin, among from the conventionally used, regarding the resin component of the resinous base-body for photosensitive drums, a polyamide series resin is preferable due to the better surface smoothness, and also excellent chemical resistance, mechanical strength and the like. Typical examples of polyamide series resins are nylon-11, nylon-12, nylon-46, nylon-6, nylon-66, nylon-MXD6, nylon-610, nylon-612, nylon-1212, copolymer thereof, and the like. Among these polyamides, nylon-6 and nylon-66 are preferable because of excellent molding performance and low cost.

A low-hydroscopic resin is able to be employed together with the aforementioned polyamides in parallel so as to inhibit change in dimension due to moisture absorption and so on. Typical examples of the low-hygroscopic resin are polypropylene, polyphenylene ether, polyphenylene and so on. It is desirable to appropriately select these non-hygroscopic resins considering compatibility, etc. with the polyamide series resin.

The electroconductive resin composite is prepared by blending an electroconductive agent with one of the above resins. Such electroconductive agent is not restricted so long as it is dispersed uniformly into the resin component and typical examples are carbon black, graphite, metal powders such as aluminum, copper, nickel and the like, electroconductive glass powder, and so on. However, carbon black is particularly preferable. The electroconductive agent is blended with a base-resin in aforementioned range so as to control the surface resistance of the base-body for photosensitive drums.

A cylindrical resinous base-body for the photosensitive drums of this invention may contain an inorganic filler such as various fibers, whiskers and the like for reinforcement or weight gain thereof if it is required. Namely electroconductive fibers and whiskers such as carbon fiber, electroconductive whisker, electroconductive glass fiber and the like, and non-electroconductive fibers such as whisker, glass fiber and the like are typical. The electroconductive fiber and whisker act as an electroconductive agent, and it is probable to decrease in quantity of an electroconductive agent such as carbon black incorporating to the electroconductive resin composite. Regarding the blending amount of the inorganic filler, there is no limitation in particular, and may be selected depending on the kind of the inorganic filler, the length and the diameter of the fiber, etc. appropriately. Usually, the amount is preferable to be from 1 to 30% by weight based on a total amount of the conductive resin composition, more preferable to be from 5 to 25% by weight, and desirable to be from 10 to 25% by weight.

Further, if it is required, a known additive such as polytetrafluoro-ethylene (PTFE), silicone resin, molybdenum disulfide ($MoS_2$), various metal soap and the like other than the inorganic fillers is possible to be blended with the electroconductive resin composite. Furthermore, it is possible to execute surface treatment to the electro conductive agent, the inorganic filler and the like by using a conventional silane series coupling agent, a titanium series coupling agent and the like so as to improve particularly the impact strength thereof.

In addition to the above description, aiming to produce a photosensitive drum being excellent in adhesion of the photosensitive layer as well as forming high quality images, aiming to form the photosensitive layer insoluble to coating solution, and aiming to obtain the photosensitive drums including the base-body, it is preferable that the resin composition of the base-body contains a resin insoluble to the solution. By choosing these, the photosensitive layer is not delaminated at the adhesion test of the layer formed on the base-body.

In the case of applying an amorphous resin (polycarbonate, polyphenylene ether, etc), such a resin causes formation of non-uniform layer or contamination of the solution because the resin is soluble to it. Although typical solvents contained in the solution are generally chloroform, acetone, toluene, methanol, isopropanol and cyclohexanol, it is preferable that a resin for the base-body is insoluble to the solution. In view of the above description, the polyamide series resin, particularly the aliphatic polyamide series resin is preferable, and for example, nylon-6, nylon-66 and a resin composition containing at least nylon-6, or nylon-66 are desirable.

In this case, by employing the resins insoluble to the solution, it is able to provide the base-body without having the aforementioned problems due to its insolubility to the solution, thereby capable to construct a photosensitive drum being able to form images in excellent quality. In addition, "insoluble to the solution" means that the resin is not soluble to the solvent contained in the solution for forming the photosensitive layer.

It is required for said base-body of the photosensitive drums that the photosensitive layer is not delaminated at the adhesion test of the photosensitive layer formed on the base-body by using the solution. If the adhesion of the layer formed on the base-body is low, there happens to form an inferior image during the image formation step.

For the shape of the base-body for photosensitive drums in the present invention, a base-body of a cylindrical shape, a column shape or the like is preferable since it is enable to form an image easily on a recording medium by rotation thereof. As a molding method for the base-body, it is possible to illustrate injection molding, extrusion molding or the like, although it is not restricted, injection molding is particularly preferable. A molding condition is determined optionally depending on a resin type for the base-body and the like.

The surface roughness of the external surface of the cylindrical resinous base-body for photosensitive drums in this invention is preferable, but not limited too, to be 0.8 $\mu$m or less, particularly 0.28 $\mu$m or less in terms of the centerline average roughness Ra, 1.6 $\mu$m or less, particularly 0.8 $\mu$m or less in terms of the maximum height Rmax, 1.6 $\mu$m or less, particularly 0.8 $\mu$m or less in terms of the ten-point average roughness Rz. Said Ra, Rmax or Rz greater than the above values may cause inferior image since the concavity and convexity of a surface of the resinous base-body appears on the photosensitive layer of the photosensitive drums.

The photosensitive drum of this invention is to be applied with a photosensitive layer and also, if necessary, other layers such as an undercoat layer, a protective layer and the like on the surface of the main portion of the cylindrical resinous base-body mentioned above. It is desirable for the above photosensitive layer to have, at least, a charge-generating layer and a charge transfer layer. Herein, the charge-generating layer comprises generally a charge-generating compound and a binder resin. There is no limitation for the charge-generating compound, therefore it is conventionally selected from known compounds being used for a charge-generating layer for photosensitive materials, and conventionally it is selected appropriately from among the publicly known chemical compounds used for the charge-generating layer of photosensitive materials such as various inorganic series electroconductive chemical compounds or organic series electroconductive chemical compounds. Among these compounds, the chemical compounds having excellent charge-generating capability are desirable. Moreover, regarding the binder resin, there is also no limitation in particular, and it is selected appropriately from among the resin publicly known as those used conventionally for charge-generating layers of photosensitive materials. The charge-generating layer can be formed by well-known process of coating or vapor deposition, etc.

On the other hand, it is desirable for the charge transfer layer to have a heterogeneous charge transfer layer or a homogeneous charge transfer layer. Regarding the heterogeneous charges transfer layer, although it is not restricted, a heterogeneous charge transfer layer containing dispersed-particles, a heterogeneous charge transfer layer of a phase separated type and the like are preferable. The heterogeneous charge transfer layer is obtained by using known methods such as application of material-dispersed solvent, wherein the material such as the aforementioned polymer and the like is to be incorporated into the heterogeneous charge transfer layer.

As the aforementioned homogeneous charge transfer layer, although it is not restricted, it is preferable to have the higher charge transfer capability and contain polymer materials with excellent film formability. The homogeneous charge transfer layer is obtained by using known methods such as application of material-dispersed solvent, wherein the material such as the aforementioned polymer materials and the like is to be incorporated into the homogeneous charge transfer layer

EXAMPLES

This invention will be described in further detail with reference to Examples, which does not limit the scope of this invention.

Examples 1 to 3, and Comparative Examples 1,2

The specific gravity and the flexural rigidity of the electroconductive resin composition and also the electric power consumption were measured according to the following methods:

(1) Specific Gravity

A sheet-type test piece was molded by thermally pressing pellets of an electroconductive resin composition and followed by measuring the specific gravity of each sheet in accordance with the water displacement method of JIS K7112.

(2) Flexural Rigidity

A test piece was molded by using aforementioned electroconductive resin composition, then measured the flexural modulus thereof in accordance with ASTM D-790 and calculated the flexural rigidity by using the following equation:

$$E1 = E \times \pi/64 \times (d_2^4 - d_1^4)$$

Wherein, E 1: Flexural rigidity, E: Flexural modulus, $d_1$: External diameter of the base-body, $d_2$: Internal diameter of the base-body.

(3) Electric Power Consumption

It is measured by providing a power supply circuit with a current-voltage measuring device during the operation of a laser beam printer equipped with a base-body for drums.

Each electroconductive resin composition of Examples 1 to 3 and Comparative Examples 1 to 2 having the blending compositions indicated in Table 1 was prepared and followed by measuring the specific gravity and the flexural rigidity thereof. The results are shown in Table 1.

TABLE 1

| | Example | | | Comparative Example | |
|---|---|---|---|---|---|
| Component (mass %) | 1 | 2 | 3 | 1 | 2 |
| PA66 | 35 | 60 | — | — | — |
| PA6 | 35 | — | — | — | — |
| PPS | — | — | 70 | 45 | — |
| PP | — | — | — | — | 70 |
| C/B | 10 | 10 | 10 | 10 | 10 |
| Whisker | 20 | 30 | 20 | 45 | 20 |
| Specific Gravity | 1.35 | 1.41 | 1.68 | 1.72 | 1.08 |

TABLE 1-continued

|  | Example | | | Comparative Example | |
| --- | --- | --- | --- | --- | --- |
| Component (mass %) | 1 | 2 | 3 | 1 | 2 |
| Flexural Rigidity (kg.mm²) | 5.76 × 10⁶ | 6.23 × 10⁶ | 6.11 × 10⁶ | 7.87 × 10⁶ | 2.38 × 10⁶ |
| Electric-Power Consumption (W) | 120 | 130 | 145 | 160 | 105 |

\* PA66: nylon66 [UBE nylon ®] manufactured by UBE INDUSTRIED, LTD.
\* PA66: nylon6 [UBE nylon ®] manufactured by UBE INDUSTRIED, LTD.
\* PPS: polyphenylene sulfide [Fortron ®] manufactured by Polyplastics Co., Ltd.
\* PP: polypropylene [IDEMITSU PP ®] manufactured by IDEMITSU PETROCHEMICAL, LTD.
\* C/B: carbon black [Ketzen-black] manufactured by LION CORPORATION
\* Whisker: potassium titanate [TISMO ®] manufactured by Otsuka Chemical Co., Ltd From the results shown in Table 1, the base-bodes of "Examples 1 to 3", which were molded from the electroconductive resin compositions having the specific gravity from 1.1 to 1.7, resulted in lowering the electric-power consumption due to effective weight saving, while having been maintaining enough mechanical strength (flexural rigidity) and dimensional precision (evaluated by rotational wobble). On the contrary, the base-body of Comparative Example 1 that was molded from the electroconductive resin composition having the specific gravity of more than 1.7, resulted in largely increasing the electric-power consumption due to larger mass, although having enough mechanical strength (flexural rigidity). Further, the base-body of Comparative Example 2, which was molded from the electroconductive resin composition having the specific gravity less than 1.1, resulted in lowering the electric-power consumption due to effective weight saving, however, the mechanical strength was declined sharply; therefore it is difficult to put it to practical use.

Examples 4 to 6, and Comparative Examples 3,4

The measurement of the apparent viscosity of an electroconductive resin composition and evaluation of the moldability of a base-body for drums were carried out according to the following methods:

(4) Apparent Viscosity;

It was measured by using the flow tester (CFT-C) manufactured by Shimazu Corporation in accordance with JIS K7210 (as reference test). Specifically, the apparent viscosity at the shear rate of $10^4 S^{-1}$ was decided by approximating, according to the least square method, a series of the apparent viscosity at the shear rates from $10^3 S^{-1}$ to $10^5 S^{-1}$.

(5) Molding Performance of the Drum

A base-body of external diameter 24 mm, length 260 mm and wall thickness 1.7 mm was molded from each composition by using injection molding, and the molding performance as well as the product were evaluated. In addition, the temperature of the cylinder of the molding machine was set to the same temperature of viscosity measurement indicated in Table 2. Each electroconductive resin composition of Examples 4 to 6 and Comparative Examples 3 to 4 according to the blending compositions indicated in Table 2 was prepared and then measured the apparent viscosity. The results are shown in Table 2. Further, the base-body molded from the electroconductive resin composition was evaluated with respect to the molding performance of the drum. The results are shown in Table 2.

TABLE 2

|  | Example | | | Comparative Example | |
| --- | --- | --- | --- | --- | --- |
| Component (mass %) | 4 | 5 | 6 | 3 | 4 |
| PA66 | 35 | 60 | — | 60 | — |
| PA6 | 35 | — | — | — | — |
| PPS | — | — | 70 | — | 85 |
| C/B | 10 | 10 | 10 | 10 | 10 |
| Whisker | 20 | 30 | 20 | 20 | 5 |
| Measureing Temperature (° C.) | 280 | 280 | 320 | 280 | 280 |
| Apparent Viscosity (poise) | 7.1 × 10² | 2.3 × 10³ | 2.1 × 10² | 4.5 × 10³ | 9.3 × 10¹ |
| Molding of Base-body | excellent | excellent | excellent | short-shot | Mold flash |

\* PA66, PA6, PPS, C/B and Whisker; the same as the remarks in Table 1

As all too obvious from the results in Table 2, the electroconductive resin composition, of which apparent viscosity at the shear rate of $10^4 S^{-1}$ is in the range from $1 \times 10^2$ poise to $3 \times 10^3$ poise, is able to be molded to the excellent base-body for photosensitive drums being installed to an electrophotographic apparatus without inferior molding such as mold flash, short-shot and the like. On the contrary, since the apparent viscosity of the comparative resin composition at the shear rate of $10^4 S^{-1}$ is too high, more than $3 \times 10^3$ poise, the short-shot or inferior transfer on the mold surface was occurred. Therefore it is difficult to put it into the practical use. Further, since the apparent viscosity of the electroconductive resin composition at the shear rate of $10^4 S^{-1}$ is too low, less than $1 \times 10^2$ poise, the mold flash is observed and treatment procedures of the mold flash is required; therefore the product yield is declined.

Examples 7 to 9, and Comparative Examples 5,6

The impact strength value test of the electroconductive resin composition and the fall-down test were carried out as the followings:

(6) Izot Impact Value Test (Notched)

A test piece was produced by injection molding in accordance with ASTM D-256.

(7) Fall-Down Test

A base-body of external diameter 24 mm, length 260 mm and wall thickness 1.7 mm was molded from each composition by using injection molding, then the base-body was freely fled down to a concrete floor, thereafter evaluated. Each electroconductive resin composition of Examples 7 to 9 and Comparative Examples 5 to 6 according to Table 3 was prepared and then measured the Izot impact value thereof. The results are shown in Table 3. Further, the base-body molded from the electroconductive resin composition was evaluated with respect to Fall-Down Test. The results are shown in Table 3.

Examples 10 to 14, and Comparative Examples 7,8

The water absorption percentage of an electroconductive resin composition and the external diameter variation were measured in accordance with the following methods.

(8) Water Absorption

It was measured in accordance with ASTM D-570.

(9) External Diameter Variation of Base-Body

Measuring the original external diameters of the both ends (called A-side, B-side) of the base-body and also the external diameters (post-diameters) after the base-body was left for 24 hours under the condition of 50° C. and 90% of RH (relative humidity), then the variation of the external diam-

TABLE 3

|  | Example | | | Comparative Example | |
|---|---|---|---|---|---|
| Component (mass %) | 7 | 8 | 9 | 5 | 6 |
| PA66 | 35 | 25 | — | 25 | 50 |
| PA6 | 35 | 25 | — | 25 | — |
| PPE | — | — | 60 | — | — |
| C/B | 10 | 10 | 10 | 10 | 10 |
| Whisker | 20 | 40 | 30 | 40 | 40 |
| Silane Coupling Treatment | none | yes | none | none | none |
| Izot Impact Value (notched) (J/m) | 42 | 50 | 38 | 25 | 20 |
| Fall-down Test | no breakage | no breakage | no breakage | breakage | breakage |

* PA66, PA6, C/B and Wisker; the same as the remarks in Table 1
* PPE; modified polyphenylene ether [Xylon ®] manufactued by Asahi Kasei Corporation
* Silane coupling agent; manufactured by NIPPON UNICAR CO., LTD.

From the results as shown in Table 3, a base-body for photosensitive drums molded from each electroconductive resin composition of Examples 7 to 9 having the Izot impact of 30 J/m or larger is excellent in the Izot impact, therefore there seems not to be broken by impact in the case of transportation or falling down thereof. On the contrary, a base-body for photosensitive drums molded from each electroconductive resin composition of Comparative Examples 5 and 6 having the Izot impact less than 30 J/m is poor in the Izot impact, therefore there seems to be broken by impact in the case of transportation or falling down thereof and it is not possible to put it practical use.

eter was derived from the difference between the diameters before and after it was left under said condition.

Each electroconductive resin composition of Examples 10 to 14 and Comparative Examples 7 to 8 according to the blending compositions indicated in Table 4 was prepared and then measured the water absorption percentage thereof. The results are shown in Table 4. Further, a base-body of external diameter 30 mm, length 260 mm and wall thickness 1.7 mm was molded from each composition by using injection molding, then the variation was evaluated. The results are shown in Table 4.

TABLE 4

|  | Example | | | | | Comparative Example | |
|---|---|---|---|---|---|---|---|
| Component (mass %) | 10 | 11 | 12 | 13 | 14 | 7 | 8 |
| PA66 | 14 | 35 | 70 | 56 | 35 | 20 | — |
| PA6 | — | — | — | 14 | 35 | 50 | 70 |
| PAMXD6 | 56 | 35 | — | — | — | — | — |
| C/B | 10 | 10 | 10 | 10 | 10 | 10 | 10 |
| Whisker | 20 | 20 | 20 | 20 | 20 | 20 | 20 |
| Water Absorption Parcentage (%) | 0.35 | 0.1 | 0.7 | 0.9 | 1.5 | 1.6 | 1.8 |
| Original: | | | | | | | |
| A side (mm) | 29.9856 | 29.9842 | 29.9763 | 29.9624 | 29.9586 | 29.9553 | 29.9536 |
| B side (mm) | 29.9664 | 29.9658 | 29.9554 | 29.9498 | 29.9386 | 29.9368 | 29.9358 |
| Post-; | | | | | | | |
| A side (mm) | +0.01 | +0.02 | +0.04 | +0.06 | +0.06 | +0.12 | +0.16 |
| B side (mm) | +0.015 | +0.022 | +0.05 | +0.08 | +0.09 | +0.13 | +0.18 |

* PA66, PA6, C/B and Whisker; the same as the remarks in Table 1
* PAMXD6; [TOYOBO nylon600 ®] manufactured by Toyobo Co., Ltd.

From the results shown in Table 4, the external diameter variation of each base-body of Examples 10 to 14, molded from an electroconductive resin composition having the water absorption percentage of 1.5% or less, is 0.1 mm or less, therefore the dimensional precision under the condition of high-temperature and high-humidity is excellent. On the contrary, the variation of each base-body of Comparative Examples 7 and 8 molded from an electroconductive resin composition having the water absorption percentage of more than 1.5% is more than 0.1 mm, therefore it is not possible to put it into practical use due to losing the dimensional precision under the condition of high-temperature and high-humidity.

Examples 15 to 19, and Comparative Examples 9, 10

The measurement of the heat deflection temperature and evaluation of the variation of the straightness were carried out according to the following methods:

(10) Load Flexure Temperature

It was measured in accordance with JIS K7207.

(11) Straightness

The straightness means a measure of geometrical tolerance as defined in JIS B0021, and it was measured by following method: A cylindrical base-body was placed approximately in a parallel direction to the benchmark-edge having high linear precision, the clearance between the benchmark-edge and the surface of the cylindrical base-body was measured in the length direction by using a laser detector and a transmitter, then a graph is plotted using the data thereof, followed by drawing a base-line tangent to the both ends of the graph and the maximum deviation from the base-line is the straightness.

Each electroconductive resin composition of Examples 15 to 19 and Comparative Examples 9 and 10 according to each blending composition indicated in Table 5 was prepared and then a base-body of external diameter 30 mm, length 260 mm and wall thickness 1.7 mm was molded from each composition by using injection molding. The load flexure temperature of each base-body obtained was measured and also the straightness (post-straightness) thereof was evaluated after it had been left at 120° C. for 2 hours. The results are shown in Table 5.

From the results shown in Table 5, because the load flexure temperatures of the base-bodies of Examples 15 to 19 are 150° C. or higher and the straightness deviation is 40 μm or less, each dimensional precision thereof is excellent during a drying step of each OPC (organic semiconductor) layer. On the contrary, because the heat deflection temperatures of the base-bodies of Comparative Examples 9 and 10 are less than 150° C. and the straightness deviation is more than 40 μm, the dimensional precision thereof is declined during a drying step of the OPC layer. Therefore, it is difficult to put practical use since an image characteristic is adversely affected.

Examples 20 to 22, and Comparative Examples 11, 12

The measurements of the diameter and the entire length of a base-body for photosensitive drums, and also the evaluation of the image characteristics thereof were carried out according to the following method;

(12) Measurement of Diameter and Entire Length

Employing a dimension measurement device (Laser-Scanning Micrometer), the base-body for the photosensitive drums was being rotated at the speed of three rotations per second, and the measurement was carried out 256 times during the three rotations, consequently averaging the results therefrom so as to obtain the measurement value. Thereafter, a photosensitive layer of the thickness 30 μm was formed on the surface of the base-body, and the image characteristics were evaluated according to the following method. The results are shown in Table 6.

(13) Evaluation of Image Characteristics

The drum constructed from aforementioned base-body was installed to a Laser Shot Printer and thereby formed an image which was evaluated visually. A cylindrical base-body comprising a component shown in Table 6 was molded, and the diameter and the entire length thereof were measured; 24 mm and 260 mm respectively at 25° C., 50% RH. Subsequently the base-body was left for 240 hours in a heat-humidity oven being kept at high-temperature and high-humidity (the temperature 50° C., the humidity 90% RH), thereafter the dimensions were measured in order to evaluate the dimensional variations of both the diameter and the entire length. The results are shown in Table 6.

TABLE 5

| | Example | | | | | Comparative Example | |
|---|---|---|---|---|---|---|---|
| Component (mass %) | 15 | 16 | 17 | 18 | 19 | 9 | 10 |
| PA66 | 14 | 35 | 70 | 56 | 35 | 20 | — |
| PA6 | — | — | — | 14 | 35 | 50 | 70 |
| PAMXD6 | 56 | 35 | — | — | — | — | — |
| C/B | 10 | 10 | 10 | 10 | 10 | 10 | 10 |
| Whisker | 20 | 20 | 20 | 20 | 20 | 20 | 20 |
| Load Flexure Tempareture (° C.) | 245 | 235 | 205 | 170 | 155 | 133 | 125 |
| Original Straightness (μm) | 43 | 52 | 55 | 61 | 53 | 59 | 56 |
| Post-Straightness (μm) | 52 | 59 | 61 | 71 | 63 | 105 | 125 |
| Straightness Deviation (μm) | 9 | 7 | 6 | 10 | 10 | 46 | 69 |

* PA66, PA6, C/B and Whisker; the same as the remarks in Table 1
* PAMXD6; [TOYOBO nylon600 ®] manufactured by Toyobo Co., Ltd.

TABLE 6

| Examples & Comparative Examples | Blending Ratio of Component (mass %) | | | | | Dimension variation (%) | | Image Characteristic |
|---|---|---|---|---|---|---|---|---|
| | PA66 | PA6 | PPS | C/B | Whisker | Diameter | Entire Length | |
| Example 20 | 35 | 35 | — | 10 | 20 | 1.4 | 0.12 | excellent |
| Example 21 | 60 | — | — | 10 | 30 | 1.0 | 0.08 | excellent |
| Example 22 | — | — | 70 | 10 | 20 | 0.5 | 0.04 | excellent |
| Comparative Example 11 | 40 | 45 | — | 10 | 5 | 2.0 | 0.19 | unevenness |
| Comparative Example 12 | 75 | 10 | — | 10 | 5 | 1.7 | 0.16 | unevenness |

* PA66, PA6, PPS, C/B and Whisker are the same as the remarks in Table 1.

Examples 23 to 25 and Comparative Examples 13 to 16

The measurements of the surface resistance of a base-body for photosensitive drums and the evaluation of the image characteristics thereof were carried out according to the following methods:

(14) Surface Resistance Value of Resinous Base-Body

By employing a four-point-probe type resistivity measurement device "Rolester GP"® ASP Probe (manufactured by Mitsubishi Chemical Corporation in accordance with JIS K7194), the voltage of 90 V (DC) was impressed and the resistance value was read when the resistance value was stabilized.

(15) Image Characteristics of Photosensitive Drum

A photosensitive drum was installed to a laser-shot printer, and after it was operated at the speed of 20 to 40 sheets per minute, the images were evaluated visually. A base-body of external diameter 24 mm and length 260 mm was molded from each composition indicated in Table 7 by using injection molding. Each surface resistance of each base-body is shown in Table 7. Subsequently, forming a photosensitive layer of thickness 30 μm on said base-body made a photosensitive drum, and then the image characteristics were evaluated. The results are shown in Table 7.

Examples 26 to 28, and Comparative Examples 17 to 21

Production of the Base-body for Photosensitive Drums

By using the resins indicated in the item Resin of Table 8, each cylindrical base-body was manufactured; the dimension was 24 mm(diameter)×260 mm(length).

Evaluation of the Solvent Resistance Test

By using chloroform, acetone, toluene, methanol, isopropanol and cyclohexane, the solvent resistance test below was carried out on each resin used for manufacturing the base-body for photosensitive drums and then evaluated the test results in accordance with the following classification: C means that it was soluble to one of the solvents and A means that it was insoluble to all the solvents.

(16) Solvent Resistance Test

Having measured the weight of each resin used for the base-bodies of photosensitive drums, each resin soaked into each of the solvents for 24 hours at room temperature (24° C.), and followed by measuring the mass of each of the resins again, and it was evaluated as to whether or not each of the resins was soluble by calculating the weight variation. The results are shown in Table 8.

(17) Manufacturing Photosensitive Drum and Evaluation of Coating Test

Having formed, by a soaking and coating method, a photosensitive layer of thickness 30 μm on the base-body for

TABLE 7

| Examples & Comparative Examples | Blending Ratio of Component (mass %) | | | | | Surface Resistance ($\Omega/\square$) | Image Characteristic |
|---|---|---|---|---|---|---|---|
| | PA66 | PA6 | PAMXD6 | Whisker | C/B | | |
| Example 23 | 25 | 25 | — | 20 | 30 | $1.2 \times 10^1$ | excellent |
| Example 24 | 20 | 20 | — | 20 | 40 | $5.5 \times 10^0$ | excellent |
| Example 25 | 27.5 | — | 27.5 | 20 | 25 | $3.3 \times 10^2$ | excellent |
| Comparative Example 13 | 36.5 | 36.5 | — | 20 | 7 | $3.4 \times 10^6$ | unevenness |
| Comparative Example 14 | 35 | 35 | — | 20 | 10 | $1.1 \times 10^5$ | unevenness |
| Comparative Example 15 | 32.5 | 32.5 | — | 20 | 15 | $7.5 \times 10^3$ | unevenness |
| Comparative Example 16 | 32.5 | — | 32.5 | 20 | 15 | $6.8 \times 10^4$ | unevenness |

* PA66, PA6, C/B and Whisker are the same as the remarks in Table 1.
* PAMXD6; [TOYOBO nylon600 ®] manufactured by Toyobo Co., Ltd.

As evidenced by the results, each of the base-bodies of Examples 23 to 25 is provided with the surface resistance of $1 \times 10^3$ $\Omega/\square$; therefore, each image characteristic is excellent respectively. On the contrary, the base-bodies of Comparative Examples 13 and 14 were provided with the surface resistances more than $1 \times 10^3$ $\Omega/\square$, therefore, image unevenness was recognized.

photosensitive drums, and the drum with the layer was dried at 120° C. for 2 hours. Thereafter, uniformity, smoothness and the like thereof were evaluated visually. The results are shown in the Coating Test item of Table 8, wherein C means that crack in the photosensitive layer was recognized and A means that no abnormality was recognized. The results are shown in Table 8.

(18) Evaluation of Adhesion Test

The cross cut test for the layer manufactured in the "Manufacturing Photosensitive drum" above (17) was carried out in accordance with JIS K5400; C means that the layer was delaminated, B means that it was delaminated a little and A means that it was not delaminated. The results are shown in the Adhesion Test item of Table 8.

TABLE 8

| Example & Comparative Example | Resin | Evaluation of Solvent Resistance | Coating Test | Adhesion Test |
|---|---|---|---|---|
| Example 26 | PA6 | A | A | A |
| Example 27 | PA66 | A | A | A |
| Example 28 | PAMXD6 | A | A | A |
| Comparative Example 17 | POM | A | A | C |
| Comparative Example 18 | PC | C (soluble to chloroform, toluene) | — | — |
| Comparative Example 19 | PPE | C (soluble to chloroform, toluene) | | |
| Comparative Example 20 | PBT | A | C | B |
| Comparative Example 21 | PPS | A | A | C |

*PA66: nylon66 [UBE nylon ®] manufactured by UBE INDUSTRIED, LTD.
*PA6: nylon6 [UBE nylon ®] manufactured by UBE INDUSTRIED, LTD.
*PAMXD6: [TOYOBO nylon600 ®] manufactured by Toyobo Co., Ltd.
*POM: polyacetal [TENAC ®] manufactured by Asahi Kasei Corporation
*PC: polycarbonate [Iupilon ®] manufactured by Mitsubishi Engineering Plastics Corporation
*PPE: polyphenylene ether [Xyron ®] manufactured by Asahi Kasei Corporation
*PBT: polybuthylene telephtalate [Teijin PBT ®] munufactured by Teijin Ltd.
*PPS: polyphenylene sulfide manufacuted by Tosoh Corporation (19) Evaluation of Image Quality The photosensitive drums manufactured in accordance with the "Manufacturing Photosensitive drum" above (17) were respectively installed to a Laser Shot Printer and images formed by the printer were evaluated visually. The images of Examples 26 to 28 were excellent but image unevenness was recognized in each image of Comparative Examples 17 to 21.

According to this invention, it enables to obtain a base-body for photosensitive drums and photosensitive drums including the base-body, which contribute to cost saving and electric-power consumption saving due to easy achievement of weight saving without affecting adversely to mechanical strength (flexural rigidity), moldability, dimensional precision and the like thereof. Further, it enables to obtain a base-body for photosensitive drums manufactured from an electroconductive resin composition, therefore the base-body possesses enough strength similar to a metal base-body and not being broken by impact in case of transportation or falling down thereof, and also it enables to obtain a base-body for photosensitive drums which maintains excellent dimensional precision under the use condition of high-temperature and high-humidity as well as excellent dimensional stability at a drying step of an OPC(organic semiconductor) layer because of improved heat resistance thereof.

According to this invention, further, it enables to obtain a base-body for photosensisitive drums which have high quality together with high product yield without occurrence of short-shot (less filling) or mold flash.

Furthermore, a base-body of this invention is employed for photosensitive drums being installed to a high-speed image formation apparatus such as a high-speed electrophotographic apparatus, an electrostatic recording apparatus and the like, and also the base-body is easy to be molded; it is able to control formation of inferior images because of excellency in attenuation characteristics of the electric potential on the exposure step.

More particularly, according to this invention, it is able to provide a photosensitive drum having excellency in adhesion to a photosensitive layer as well as a base-body suitable for photosensitive drums and insoluble to coating solution forming a photosensitive layer.

It is further understood by those skilled in the art that the foregoing description is a preferred embodiment of this invention and that various changes and modifications may be made in the invention without departing from the spirit and scope thereof.

What is claimed is:

1. A cylindrical resinous base-body for photosensitive drums to be used for an electrophotographic process, being made of an electroconductive resin composition and simultaneously satisfying the following requirements:

(1) a specific gravity of said resin composition is from 1.1 to 1.7, (2) an apparent viscosity of said resin composition at the apparent shear rate of $10^4 S^{-1}$ is from $1 \times 10^2$ poise to $3 \times 10^3$ poise, (3) an Izot impact value of the said resin composition is 30 J/m or greater, (4) a water absorption percentage of the said resin composition is 1.5% or less, (5) a load flexure temperature of the said resin composition is 150° C. or higher, (6) a change in dimension of the external diameter of said base-body is 1.5% or less, and (7) a surface resistance of said base-body is $1 \times 10^3$ Ω/□ (ohm/square) or less;

(8) a flexural modulus of said resin composition is 4.0× $10^6$ kg-mm$^2$ or greater;

(9) a variation of an external diameter of each end of said base-body is 0.1 mm or less when defined as a diameter difference before and after said base-body is left under a condition of 50° C. and 90% RH for 24 hrs;

(10) a variation of a straightness of said base-body is 40 μm or less when defined as a straightness difference before and after said base-body is left at 120° C. for 2 hrs;

(11) a dimensional variation of an entire length of said base-body is 0.15% or less; and (12) a surface roughness of said base-body is 0.8 μm or less in terms of a center-line average roughness $R_a$, 1.6 μm or less in terms of a maximum height $R_{max}$, and in terms of a 10-point average roughness, $R_z$;

said electroconductive resin composition comprising at least one resin selected from the group consisting of polyamide resin and low water absorption resin, an electroconductive agent in an amount of 10–40% by mass based on a total amount of the electroconductive resin compositions, and at least one inorganic filler in an amount of 1 to 30% by mass based on the total amount of the electroconductive resin compositions;

said polyamide resin being selected from the group consisting of nylon-11, nylon-12, nylon-46, nylon-6, nylon-66, nylon-MXD6, nylon-610, nylon-612, nylon-1212 and copolymers thereof; and said low water absorption resin being selected from the group consisting of polypropylene, polyphenylene ether and polyphenylene sulfide.

2. The base-body for photosensitive drums as defined in claim 1, wherein said resin composition contains an electroconductive agent with the resin.

3. The base-body for photosensitive drums as defined in claim 1, wherein the specific gravity of the electroconductive resin composition is from 1.3 to 1.7.

4. The base-body for photosensitive drums as defined in claim 1, wherein the water absorption percentage of the electroconductive resin composition is 0.7% or less.

5. The base-body for photosensitive drums as defined in claim 1, wherein said variation of the external diameter is 0.05 mm or less.

6. The base-body for photosensitive drums as defined in claim 1, wherein the load flexure temperature thereof is 170° C. or higher.

7. The base-body for photosensitive drums as defined in claim 1, wherein the variation of the straightness is 20 $\mu$m or less.

8. The base-body for photosensitive drums as defined in claim 1, wherein said resin composition contains an electroconductive agent and filler with the resin.

9. The base-body for photosensitive drums as defined in claim 8, wherein said filler is inorganic filler.

10. The base-body for photosensitive drums as defined in claim 9, wherein said inorganic filler is 1 to 30 weight percent based on the electroconductive resin composition.

11. The base-body for photosensitive drums as defined in claim 1, wherein the apparent viscosity at the apparent shear rate of $10^4 s^{-1}$ of the electroconductive resin composition is from $1\times10^2$ to $1\times10^3$ poise.

12. The base-body for photosensitive drums as defined in claim 11, wherein the measuring temperature of the apparent viscosity at the apparent shear rate of $10^4 s^{-1}$ of the electroconductive resin composition is higher than the melting point of the base-resin thereof.

13. The base-body for photosensitive drums as defined in claim 12, wherein the measuring temperature of the apparent viscosity at the apparent shear rate of $10^4 s^{-1}$ of the electroconductive resin composition is 20 to 30° C. higher than the melting point of the base-resin thereof.

14. The base-body for photosensitive drums as defined in claim 1, wherein the Izot impact value of the electroconductive resin composition is 35 J/m or greater.

15. The base-body for photosensitive drums as defined in claim 14, wherein the resin composition contains a surface-treated inorganic filler as the filler.

16. The base-body for photosensitive drums as defined in claim 15, wherein the surface-treated inorganic filler is treated by a silane coupling agent or a titanate-coupling agent.

17. The cylindrical base-body for photosensitive drums defined in claim 1, wherein the electroconductive resin composition constructing the base-body contains a resin insoluble to coating solution forming a photosensitive layer, and wherein the photosensitive layer is not delaminated in an adhesion test of the layer formed on the base-body for the photosensitive drum.

18. The base-body for photosensitive drums as defined in claim 17, wherein the coating solution forming said photosensitive layer contains at least one selected from chloroform, cyclohexane and toluene.

19. The base-body for photosensitive drums as defined in claim 1, wherein at least a polyamide type resin is used as the resin.

20. The base-body for photosensitive drums as defined in claim 19, wherein the polyamide type resin is selected from nylon-66 and nylon-6.

21. The base-body for photosensitive drums as defined in claim 1, 19 or 20, wherein the electoconductive resin contains a polyamide series resin and a low water absorption resin as the main component of the base-resin.

22. The base-body for photosensitive drums as defined in claim 21, wherein the low water absorption resin is at least one selected from polypropylene, polyphenylene ether and polyphenylene sulfide.

* * * * *